W. MUNROE.
Organ-Reed Boards.
No. 144,121.  Patented Oct. 28, 1873.
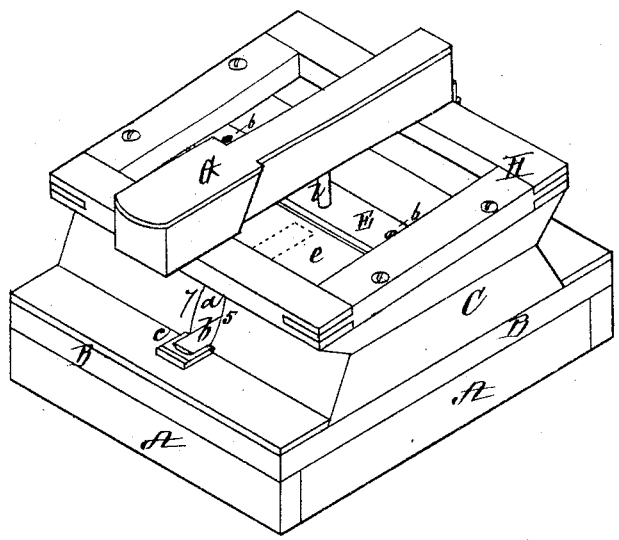
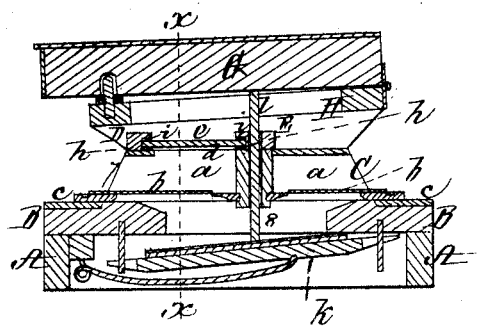
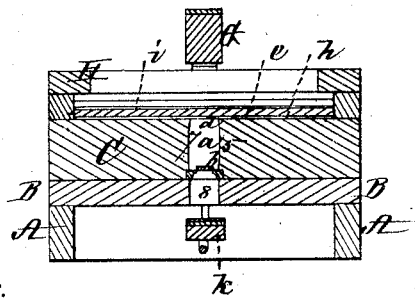
Attest:
N. W. Stearns.
N. J. Cambridge
Inventor:
William Munroe

UNITED STATES PATENT OFFICE.

WILLIAM MUNROE, OF WORCESTER, MASSACHUSETTS, ASSIGNOR TO THE MUNROE ORGAN-REED COMPANY, OF SAME PLACE.

IMPROVEMENT IN ORGAN REED-BOARDS.

Specification forming part of Letters Patent No. 144,121, dated October 28, 1873; application filed August 28, 1873.

*To all whom it may concern:*

Be it known that I, WILLIAM MUNROE, of Worcester, in the county of Worcester and State of Massachusetts, have invented an Improvement in Reed-Organ Boards, of which the following is a full, clear, and exact description, reference being had to the accompanying drawings making part of this specification, in which—

Figure 1 is a perspective view of a section of a double-reed organ. Fig. 2 is a longitudinal section through the same. Fig. 3 is a transverse section on the line $x\,x$ of Fig. 2.

My invention consists in the application of glass, porcelain, or other similar material over the open tops of the reed-cells of an organ, whereby unison in the action or function of the reeds is insured, and the tone softened, equalized, and harmonized without sacrificing or reducing its volume or power.

To enable others skilled in the art to understand and use my invention, I will proceed to describe the manner in which I have carried it out.

In the said drawings, A is a portion of the frame which extends over and forms the top of the air-chamber. (Not shown.) Upon this frame A is placed a sounding-board, B, upon which rests the reed-board C, both sides of which are provided with a series of parallel reed-cells, $a$, for the reception of the reeds $b$, which fit snugly therein, a strip of felt, $c$, being provided for the heels of each row of reeds to rest on, in order to form a close joint and prevent the passage of air thereunder. The cell of each reed is open at its top throughout its length, and is of about the form and size shown in Fig. 3, the width of the opening $d$ in the top being somewhat less than at a point, 5, about the middle of the cell. Over all the openings $d$ in the tops of each row of cells is a plate, $e$, of glass, each of the two opposite longitudinal edges of which rests on a thin strip, $h$, of felt or other suitable elastic substance, placed on the top of the reed-board in the direction of a line passing through the front or rear of the openings $d$ of the cells, another similar strip, $i$, of the same material, being placed over the upper side of each edge of the glass, and being held in place by longitudinal cleats D E, screwed at 6 to the reed-board.

By the above-described arrangement the plate of glass is securely seated on an even level bearing, whereby any possibility of jarring is avoided, the surface of the under side of the glass immediately over and between the openings $d$ being slightly raised, so as not to come in contact with the reed-board, thus allowing the outward air to pass freely from the mouth 7 to the opening $d$ in the top of each cell, and impinge on the surface of the glass, thus producing a tone of the finest quality.

Communicating with the under side of each reed $b$ is a passage, 8, leading to the air-chamber, said passage being controlled by a spring-valve, $k$, of well-known construction. This valve is opened, (to allow of the entrance of the air into the air-chamber,) when desired, by depressing its key G, which rests on and pushes a pin, $l$, down upon the valve against the resistance of its spring. The inner ends of the keys are pivoted to the rear of the key-frame H, which is secured upon the reed-board.

In the use of glass, porcelain, &c., I have discovered a peculiar fitness, by which the according harmonies overbalance and neutralize the discordant vibrations which accompany the fundamental tone in any part of the scale, whereby I am enabled to produce a sound of the finest quality of any required strength.

Should it be desired to have the openings $d$ of the cells of the reeds placed in a vertical or other position, the plate of glass would also be placed in a position to conform thereto.

What I claim as my invention, and desire to secure by Letters Patent, is—

In combination with the openings $d$ of the cells of a reed-organ, the glass plate $e$, substantially as and for the purpose described.

Witness my hand this 23d of August, 1873.

WILLIAM MUNROE.

In presence of—
  N. W. STEARNS,
  W. J. CAMBRIDGE.